(12) United States Patent
Daya

(10) Patent No.: US 12,710,075 B2
(45) Date of Patent: Aug. 18, 2026

(54) MOBILE MECHANICAL LEVERAGE TO GENERATE TORQUE FORCE TO A ROTARY SHAFT

(71) Applicant: Arvind A Daya, Fayetteville, GA (US)

(72) Inventor: Arvind A Daya, Fayetteville, GA (US)

( * ) Notice: Subject to any disclaimer, the term of this patent is extended or adjusted under 35 U.S.C. 154(b) by 0 days.

(21) Appl. No.: 18/494,998

(22) Filed: Oct. 26, 2023

(65) Prior Publication Data

US 2025/0137499 A1 May 1, 2025

(51) Int. Cl.
*F16D 41/07* (2006.01)
*F02B 75/32* (2006.01)

(52) U.S. Cl.
CPC .............. *F16D 41/07* (2013.01); *F02B 75/32* (2013.01)

(58) Field of Classification Search
CPC ................................ F16D 41/07; F02B 75/32
See application file for complete search history.

(56) References Cited

U.S. PATENT DOCUMENTS 1,701,534 A * 2/1929 Knopp .................... F01C 1/063 418/36
4,741,300 A * 5/1988 Benson ................... F02B 57/00 123/44 D
2008/0188340 A1* 8/2008 Al-Bannai ............. F02B 75/32 475/162

* cited by examiner

*Primary Examiner* — Kevin A Lathers

(57) ABSTRACT

There is thus provided in accordance with achieving a novel embodiment as a mobile on rail or mobile by road or a stationary in a container electrical generator end's gearbox rotary shaft torque turning force containment. A set of internal combustion cylinders or steam cylinders with linkage are deployed angular acceleration uniformly fixedly attached turning a large sprocket gear just as a steam locomotive wheels mechanism functions. The said large turning sprocket gear further turning the upright conveyer type mechanism sprocket gears and chains uniformly reciprocating first end of each of the central component the long leverage rigid beams thereby rotating the one way clutch sprag bearings as attached to each of the said long leverage rigid beams at the second end causing ratchet action turning the gearbox rotary shaft in one direction and the generator to rotate the specified speed and torque at full load continuously.

4 Claims, 7 Drawing Sheets

ONE WAY CLUTCH

MOBILE MECHANICAL LEVERAGE TO GENERATE TORQUE FORCE TO A ROTARY SHAFT

FIELD OF INVENTION

Figure 1:
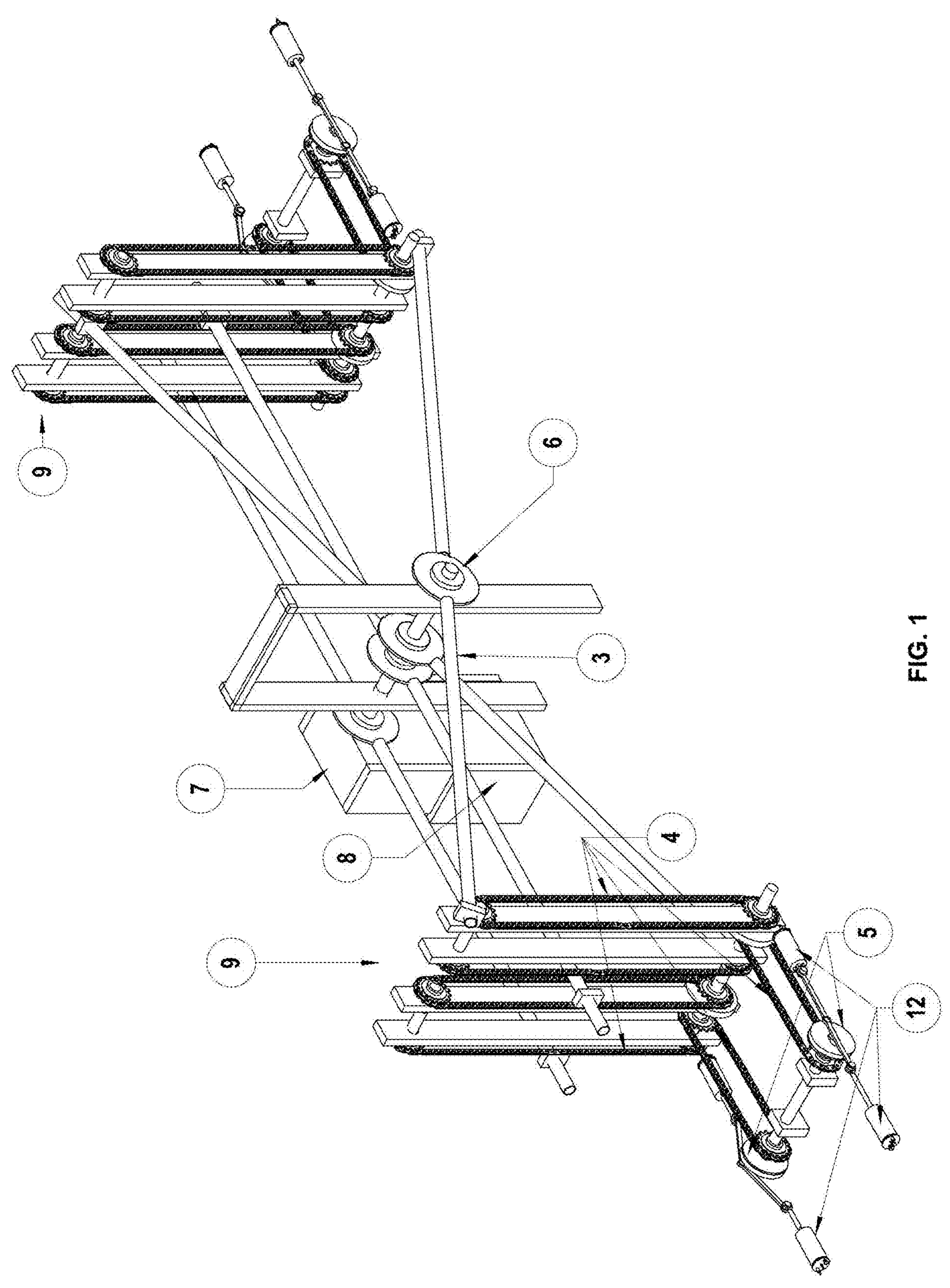

The invention relates to a mechanical leverage to generate torque force to a turn a generator rotary shaft to generate electricity.

BACKGROUND OF INVENTION

There is a general need for alternate sources for power which are inexpensive to operate and efficient and clean in operation. Prior art power generators tend to be highly inefficient that consume a great deal of the fuel to generate before that power can be utilized. Additionally, there is a need for power generators type which require little maintenance and when maintenance is required, are easy to repair.

SUMMARY OF THE INVENTION

The present invention concerns as apparatus which generates electric power from a mechanical advantage to generate torque force to a generator rotary shaft to generate electricity, with plurality of internal combustion cylinders or steam cylinders or pneumatic cylinders disposed uniformly fixedly attached at the outer ends of reciprocating long leverage rigid beams that are operated to rotate a large sprocket gear whereby turning the vertical reciprocating conveyor's sprocket gear and chain assembly each on the outer end by having a one way clutches ratcheting at midpoint of the said reciprocating long leverage rigid beams thereby to rotate the generator gearbox rotary shaft in one direction, the main component in this apparatus is plurality sets of cylinders in pairs as a unit that are rotating a large wheel and sprocket gear just as a steam locomotive engine wheels mechanism functions thus rotating the vertical reciprocating conveyor's sprocket gear and chain assembly thereby uniformly reciprocating long leverage rigid beams.

In the first pairs of cylinders of the first side and second pairs of cylinders of the second side of the reciprocating long leverage rigid beams, the said cylinder has a piston rod is guided by the crosshead, a main rod as pivoting big end link that moves with the linear motion of the piston and rod crosshead, This connected piston rod crosshead to the so called pivoting big end link connects to the crank pin on the main drivers whereby turning large cranked wheel and sprocket gear and chain, on both pairs of the first side and the second side thereby rotating vertical reciprocating conveyor's sprocket gear and chain reciprocating long leverage rigid beams. The said rotating crank pin on both pairs of the first side and the second side that are both offset from the center of each axle by approximately 86-to-93-degree distance, the piston force transmitted through the main rod crosshead thus imparts a torque to the said large cranked wheel. When the piston is fully forward or backward, the crank pin, piston rod crosshead, and pivoting big end link are all in a straight line with the center of the axle. With no offset distance from the axle pivot point, no torque can be produced to turn the said large cranked sprocket gear circular continuously conveying rotational energy. To solve the threat of so called locking up to offset one cylinders set from another-so that one sets of cylinders in pairs would always be in a position to impart torque upon the circular means of conveying rotational energy set. This value is typically set at approximately 86 to 93 degree which puts one cylinders set at mid-stroke while the other is either fully forward or backward thereby propelling the vertical reciprocating conveyor's sprocket gear and chain assembly continuously in one direction along with flywheels' momentum.

The skilled in the art will appreciate the above-mentioned advantages and superior features of the invention together with other important aspects thereof upon reading the details description which follows in conjunction with drawings

DETAILED DESCRIPTION OF EMBODIMENTS

FIG. 1 is a perspective view layout of stationary generator (power plant) of reciprocating long leverage rigid beams (3) crossing one another at midpoint that are turning the generators gearbox (7) in one direction with aid of plurality one-way clutches (6) at midpoint of the said reciprocating long leverage rigid beams (3) with two set of vertical reciprocating conveyor's sprocket gear and chain assembly as a unit (9) at each end of the said reciprocating long leverage rigid beams (3)

Figure 2:
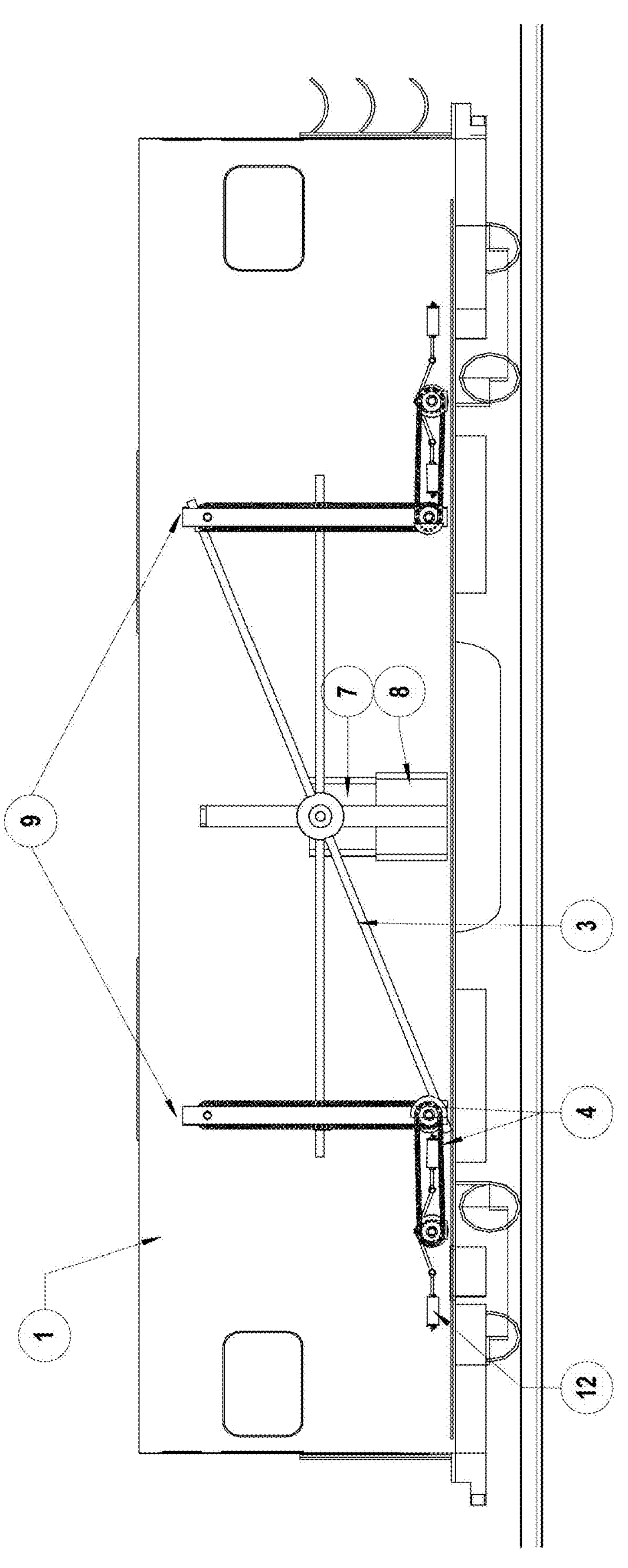

FIG. 2 is a side view of a mobile power plant on rails (1) this embodiment can be installed in a shipping container, railway goods coaches or truck tractor trailer on roads as energy power plant.

Figure 3:
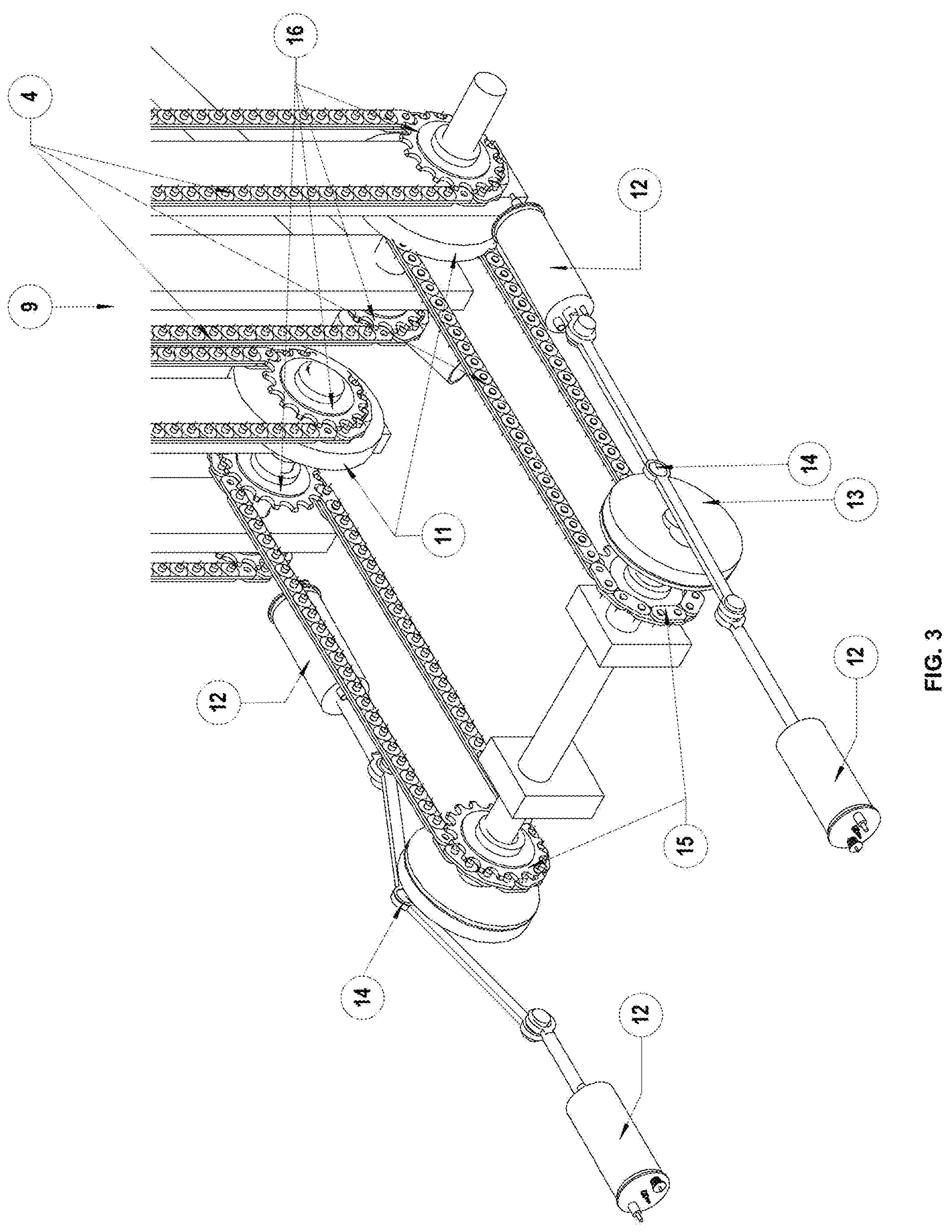

FIG. 3 is a perspective view of the plurality sets of cylinders fixedly (12) attached and operated to propel a large wheel (13) and sprocket gears (15) thereby to turn the vertical reciprocating conveyor's sprocket gear and chain (16) assembly as unit (9) to uniformly reciprocating plurality of long rigid beams (3) not shown, the main component here in the said plurality sets of cylinders (12) is the main rod as pivoting big end link that moves with the linear motion of the piston rod and crosshead. The opposite portion of the said main rod connects to the crank pin (14) on the large wheel (13) turned by sets of cylinders and the main driver (13) and follow a circular path. As the crank pin (14) is offset from the center of each axle by a certain distance between the two sets of main drivers (13) on each side, the piston forces transmitted through the main rods thus imparts a torque to the two wheels (13). This arrangement is known as a crank slider.

When the piston is fully forward or backward, the crank pin (14), piston rod, and main rod are all in a straight line with the center of the axle. With no offset distance from the axle pivot point, no torque can be produced to turn the wheels. To solve the threat "locking up" to offset one cylinder man rod and the wheel (13) from another so that cylinder main rod crank pin (14) would always be in a position to impart torque upon the wheelset. This value is typically set at approximately 86 to 93 degree which puts one cylinder set at mid-stroke while the other is fully forward or backward, thereby propelling the vertical reciprocating conveyor's sprocket gear and chain assembly (9) continuously in one direction furthermore the flywheel (11) adds additional momentum to overcome the said lock up situation and encounter friction losses.

Figure 4:
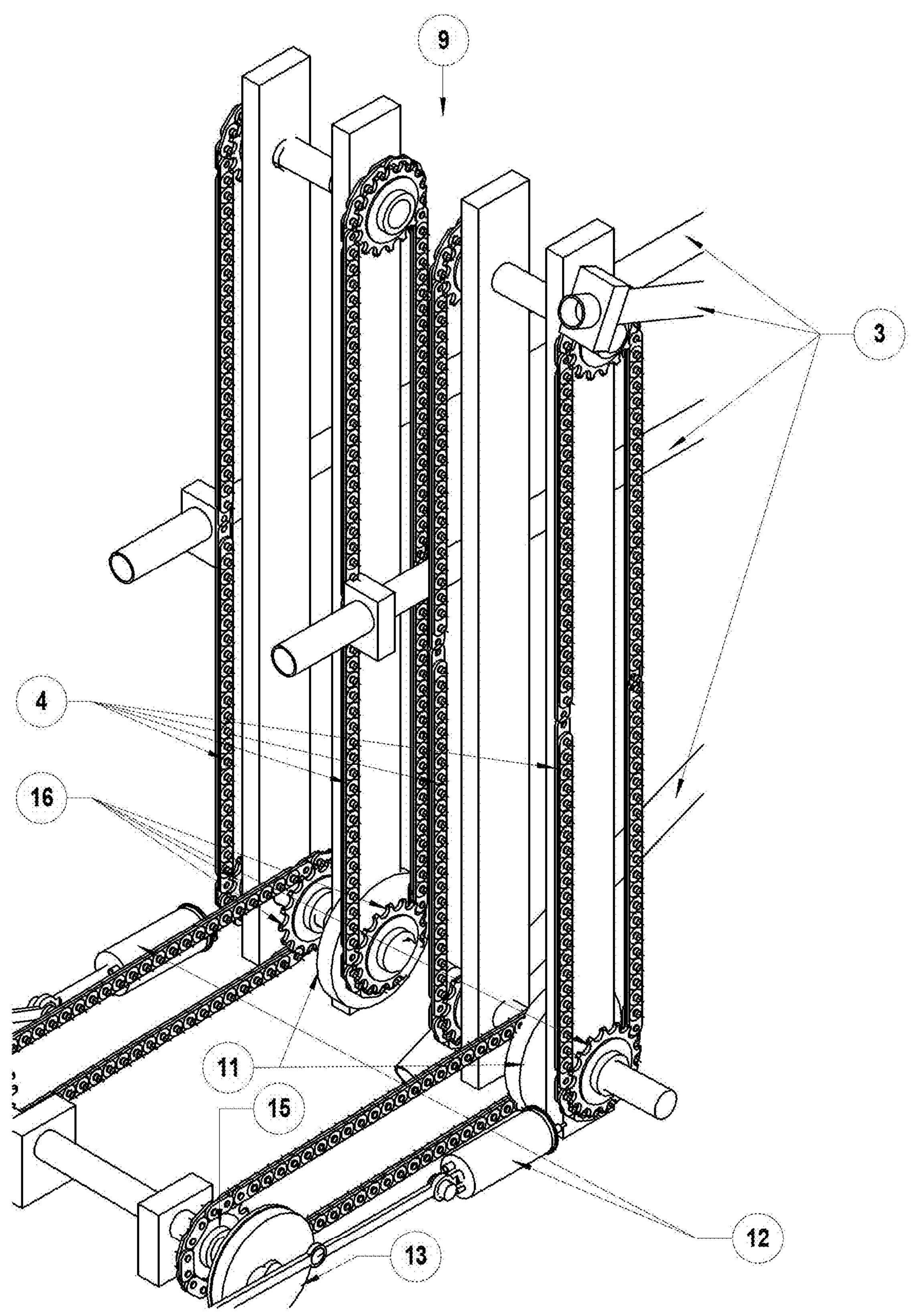
Figure 5:
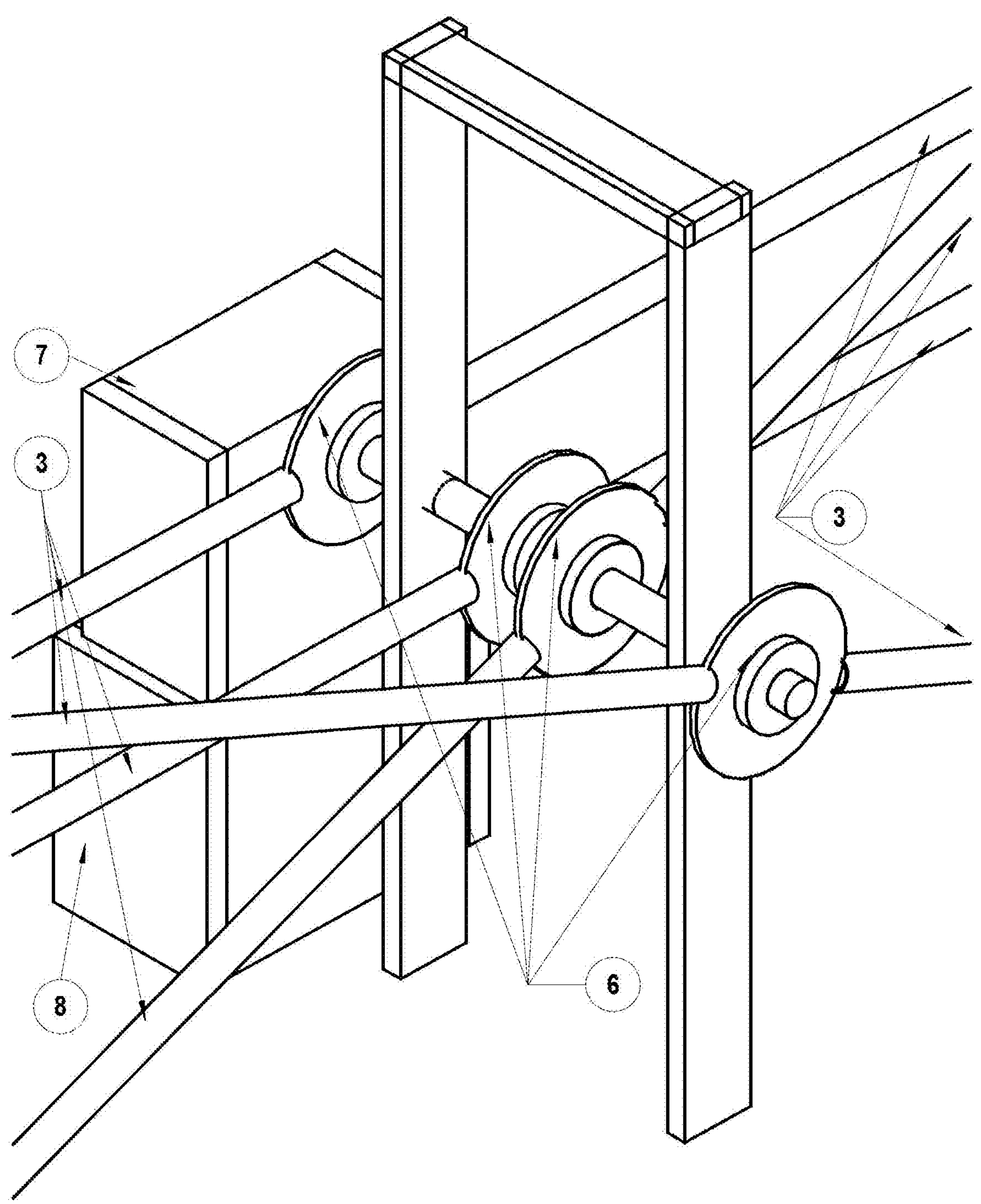
Figure 6:
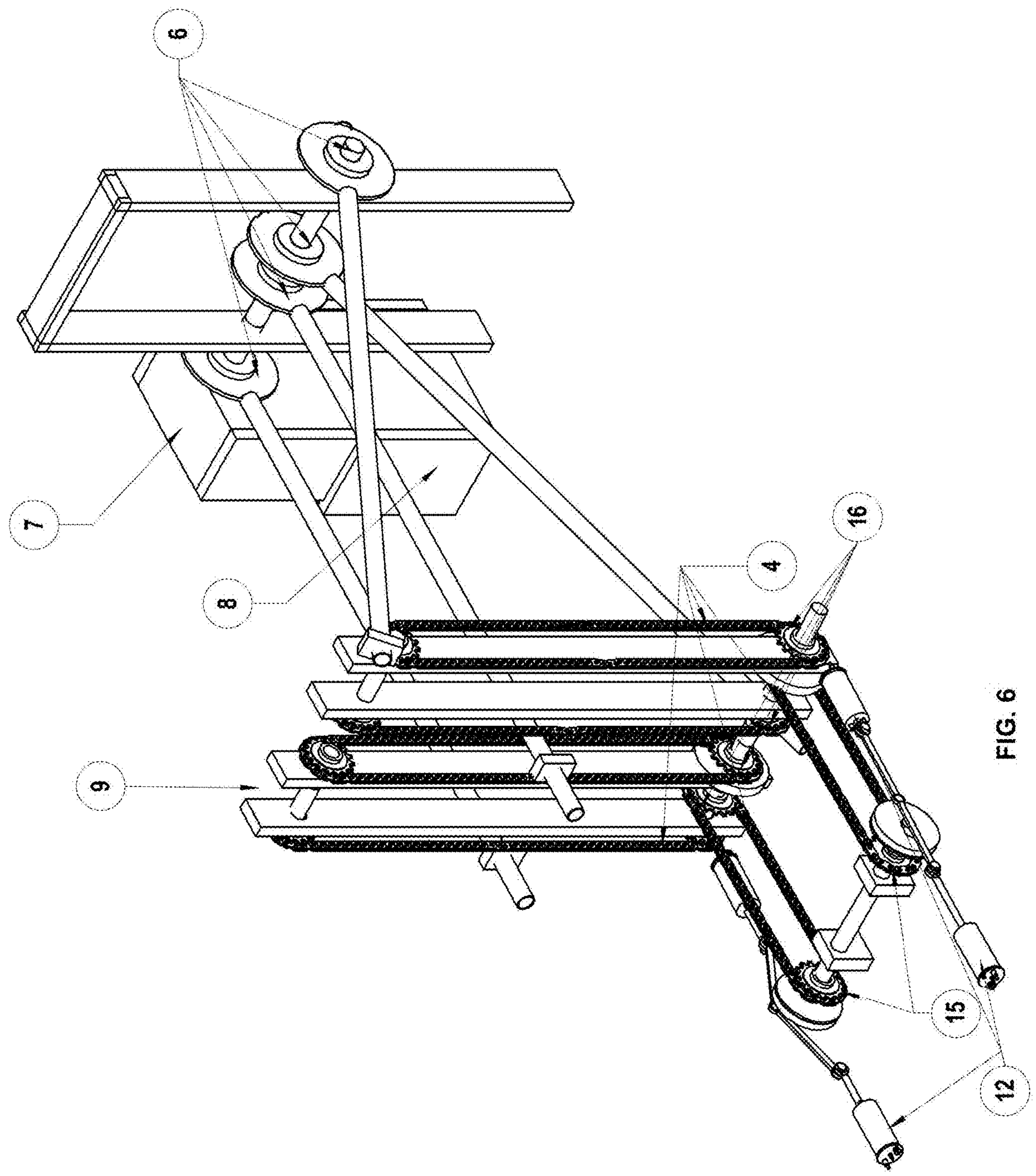

FIG. 4 is a perspective view of vertical reciprocating conveyor's sprocket gear and chain 16) assembly as a unit (9) the said conveyor's sprocket gear (16) and chain (4) propelling the flywheels (11) assisting to overcome friction losses, as the large wheel (13) and large sprocket gear (15) turns the vertical reciprocating conveyor's sprocket gear (16) and chain (4) assembly as unit (9) to uniformly reciprocating the said long leverage rigid beams (3) thereby turning the generator gearbox (7) rotary shaft in a one way direction as shown in FIG. 1 and FIG. 6. FIG. 5 is a perspective view of reciprocating long leverage rigid beams (3) that are turning the generator's (8) gearbox rotary shaft (7) in one direction with the aid of the one way clutch sprag clutch bearing or ratchet mechanism (6).

FIG. 6 is an exemplary prospective half view of FIG. 1 as unit that can function and is equally productive are half-length the size reciprocating long leverage rigid beams (3) with one set of vertical reciprocating conveyor assembly (9) as shown in FIG. 4 that are turning the generator's (8) gearbox rotary shaft (7) in one direction with the aid of the one-way clutch sprag clutch bearing or ratchet mechanism (6) achieving similar results.

Figure 7:
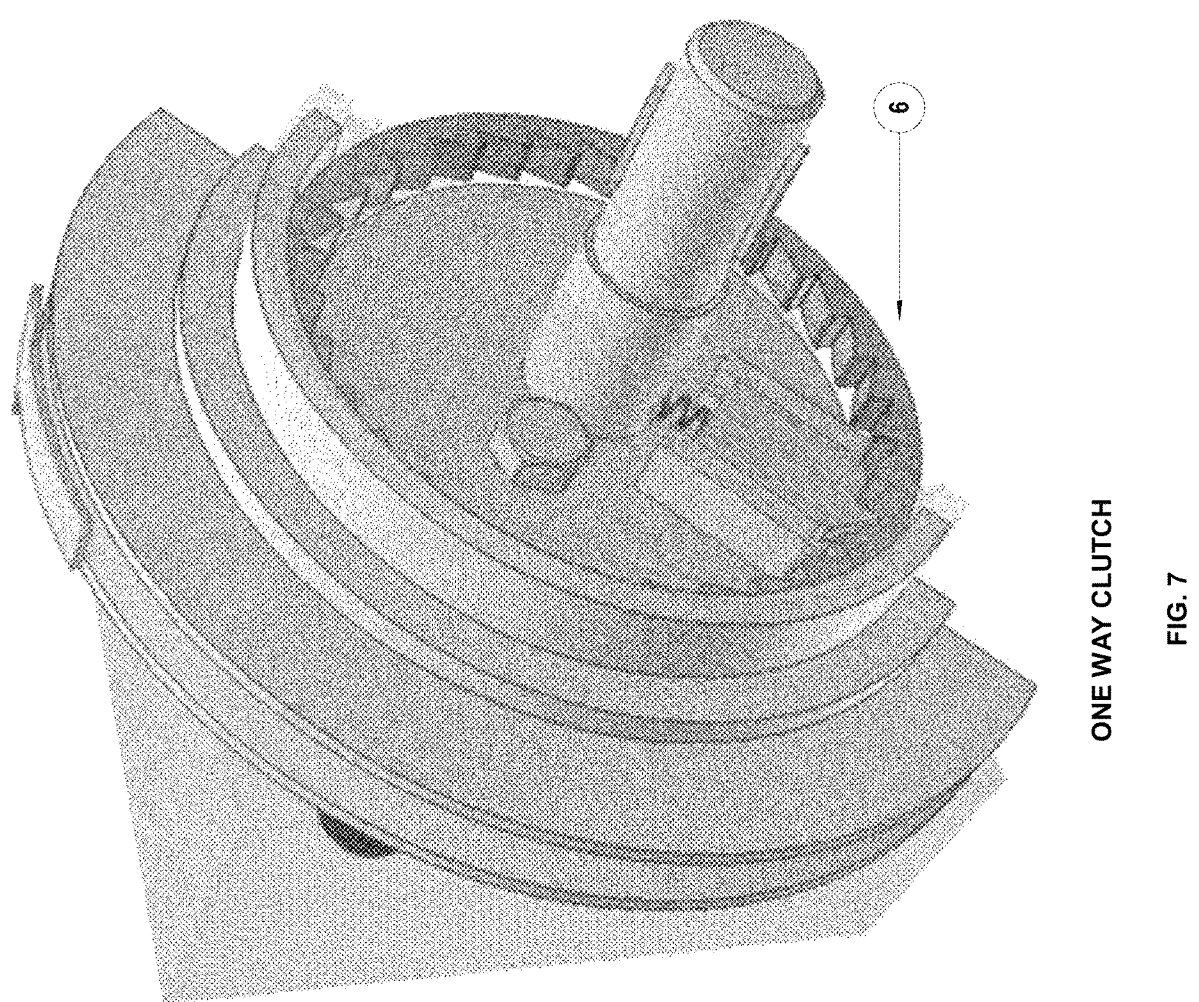

FIG. 7 is an exemplary prospective picture of ratchet mechanism (6) attached to a gearbox rotary shaft (7) rotating in one direction with the aid of the ratchet mechanism (6) or a one-way clutch bearing not shown.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention is therefore not limited by the above-described embodiment, method, and examples, but by all embodiments and methods within the scope and spirit of the invention as claimed.

What I claimed is:

1. A mobile electricity-generating apparatus driven by an internal combustion engine comprising:
- wherein the internal combustion engine output rotates at least one vertical reciprocating conveyor, thus reciprocating a first end of at least one long rigid lever beam alternatively on the said at least one vertical reciprocating conveyor;
- wherein a second end of the said at least one long rigid lever beam connects to a gearbox and ratchets a gearbox rotary shaft in one direction through a one-way clutch ratchet, thus turning the gearbox; and
- wherein the gearbox rotates a generator to generate electricity.

2. The mobile electricity generating apparatus according to claim 1, wherein the internal combustion engine comprises a set of internal combustion cylinders in pairs facing each other as a unit propelling the at least one vertical reciprocating conveyor.

3. The mobile electricity generating apparatus according to claim 1, wherein the at least one vertical reciprocating conveyor is on a frame which reciprocates each said first end of the at least one long rigid beams uniformly.

4. The mobile electricity generating apparatus according to claim 1, wherein each said second end of the at least one long rigid lever beam ratchets the one-way clutch on the gearbox rotary shaft in one direction, thereby causing rotation of the gearbox rotary shaft.

* * * * *